(12) United States Patent
Rempert

(10) Patent No.: US 6,548,573 B1
(45) Date of Patent: Apr. 15, 2003

(54) COMPOSITION AND PROCESS FOR MAKING A WATER AND MUD REPELLANT RUBBER

(75) Inventor: Carl H. Rempert, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/468,012

(22) Filed: Dec. 20, 1999

(51) Int. Cl.⁷ .................................................. C08K 9/00
(52) U.S. Cl. ....................... 523/209; 428/447; 525/100; 525/105; 528/25; 528/30
(58) Field of Search ................................ 524/492, 493, 524/266, 267, 268, 731; 523/209; 525/100, 105; 528/25, 30; 428/447

(56) References Cited

U.S. PATENT DOCUMENTS

| | | | |
|---|---|---|---|
| 3,475,205 A | | 10/1969 | Byers |
| 4,230,045 A | | 10/1980 | Fearon |
| 4,753,976 A | * | 6/1988 | Yoshoika et al. |
| 5,202,190 A | * | 4/1993 | Kantner et al. ............. 428/447 |
| 5,530,040 A | | 6/1996 | Ross |
| 5,569,318 A | | 10/1996 | Jarand |
| 6,140,393 A | * | 10/2000 | Bomal et al. |
| 6,191,247 B1 | * | 2/2001 | Ishikawa et al. |
| 6,331,605 B1 | * | 12/2001 | Lunginsland et al. ......... 528/30 |

FOREIGN PATENT DOCUMENTS

| | | |
|---|---|---|
| EP | 0 447 066 A | 9/1991 |
| EP | 0 655 480 A | 5/1995 |
| EP | 0 721 971 A | 7/1996 |
| EP | 0 849 319 A | 6/1998 |
| EP | 0 928 818 A | 7/1999 |
| JP | 06-248116 A * | 9/1994 |

OTHER PUBLICATIONS

Database WIP, Section CH week 199529, Derwent Class A12 1995–220832 XP02160195 & JP 07133375 of May 23, 1995 Sumitomo Rub.
"Merriam–Webster's Collegiate Dictionary, tenth edition" 1999, Merriam Webster Inc., Springfield, MA.*

* cited by examiner

Primary Examiner—Margaret G. Moore
Assistant Examiner—Marc S Zimmer
(74) Attorney, Agent, or Firm—Finnegan, Henderson, Farabow; Steve M Hanley

(57) ABSTRACT

A water and mud repellant compound is provided for frictionally engaged rubber surfaces, such as treads, and, in particular, to a compound for use in the manufacture of a rubber track belt on a mobile track system of a tractor.

12 Claims, No Drawings

COMPOSITION AND PROCESS FOR MAKING A WATER AND MUD REPELLANT RUBBER

TECHNICAL FIELD

The present invention relates to a water and mud repellant rubber composition, and a process of making water and mud repellant rubber components, particularly for use in a rubber track belt. This invention may also be utilized in any other application where rubber components are utilized, for example, in rubber sealing technology.

BACKGROUND ART

Various rubber components have been developed for providing a rubber belted track system, which includes an endless rubber track belt and the drive wheel for frictionally driving the track, such rubber belted track system commonly used for propelling machines or vehicles, such as agricultural tractors and the like.

Rubber surfaces, and particularly, the surface of a rubber track belt frequently operates in muddy and wet conditions, which may result in insufficient frictional engagement between two frictionally engaged surfaces, for example, the rubber track belt and the drive wheel, to permit the vehicle to be propelled along the ground. This is due to the formation of a lubricating film consisting of water, soil, and/or a combination of water and soil between the two frictionally engaged components, for example, a water film between the drive wheel and the rubber track belt.

Additionally, mixtures of water and soil, for example, mud, may also build up on the outer surface of the track, in particular between the tread lugs of a rubber track belt, causing a loss of grip between the track belt and the ground.

Currently, the only solution to the problem requires the operator to shutdown the equipment and physically remove the debris impeding the propulsion of the vehicle.

The problem of frictional engagement of automobile tires with a wet road surface, where the tread of the vehicle tire has become completely or at least partially removed through wear, is well-known. Accordingly, in the area of vehicle tires, the automobile tire industry had developed a number of compositions for application to the tread surface of a vehicle tire to increase the frictional engagement between the tire and the road surface. A few examples of this include U.S. Pat. No. 5,530,040 issued Jun. 25, 1996, to Donald B. Ross and U.S. Pat. No. 3,475,205, issued Oct. 28, 1969, to J. H. Byers. Both of these utilize a composition, which is applied to the rubber tread after the product has been manufactured.

One of the problems with the prior art approach utilized by the tire industry is that while the compositions may be helpful in providing enough traction to propel the vehicle for a period of time, such compositions eventually wear off the rubber surface.

Under harsh operating conditions, for example, in a muddy field with an agricultural tractor, this type of composition wears off the surface of the rubber to which it is applied in a short time, substantially decreasing the friction between the drive wheel and the rubber track belt. Thus, the transmission of power to the drive system is severely reduced. The cost of the downtime associated with the physical removal of the debris from the drive wheel is also high.

DISCLOSURE OF THE INVENTION

In the present invention, one aspect of the invention is a water and mud repellant composition for use in a rubber compound comprises a rubber polymer and a water and mud repellant filler, which has been modified with a silicone-based blocking agent. In another aspect of the invention, a water and mud repellant composition for use in a rubber compound comprises a water and mud repellant rubber polymer, which has been modified with a silicone-based blocking agent.

In yet another aspect of the invention, a method for making a water and mud repellant rubber composition comprises the steps of: mixing a filler and a silicone-based blocking agent, forming a mixture of the filler and the silicone-based blocking agent at ambient temperature, drying the mixture, heating the mixture in the range of about 200 to about 300 degrees C. for about one to about two hours, and compounding the product of the reaction of the filler and the silicone-based blocking agent with a rubber polymer in a Banbury mixer.

BEST MODE FOR CARRYING OUT THE INVENTION

In one embodiment of the present invention, a hydrophobic rubber compound of the present invention is composed of a filler, preferably silica, which has been reacted with a silicone-based blocking agent to produce a hydrophobic filler, which is then compounded with a rubber polymer in a Banbury mixer.

It is contemplated within the scope of the invention, depending upon the application, that any other needed additives or fillers may be additionally mixed in the Banbury mixer with the hydrophobic filler and the rubber polymer, resulting in a final hydrophobic rubber compound.

A suitable standard silica filler is sold under the trademark Aerosil 200 by Degussa. Aerosil 200 is available is powder form.

In manufacturing the hydrophobic filler, a silicone-based blocking agent is selected from the group consisting essentially of siloxanes, silanes, silanols, silazanes, silylenes, silyl groups, silyl radicals, cyclosilazanes, cyclosiloxanes, silicones, silsesquiazanes, silsesquioxanes, silsesquithianes, hydrocarbyl derivatives and combinations thereof.

The silicone-based blocking agent utilizes a hydroxy functional group which reacts hydroxy groups on the surface of the filler. The preferred silicone-based blocking agent is a hydroxy siloxane, more preferably hydroxy functional polydimethylsiloxane(silanol). A suitable silanol is sold under the trademark CRTV 944 by General Electric. CRTV 944 is available in visquous liquid form.

The amount of the silicone-based blocking agent needed is proportional to the surface area of the filler.

In this embodiment, the preferred amount of polydimethylsiloxane is in the range of from about 21 mass percent (%) to about 29 mass percent (%), even more preferably about 25 mass percent (%).

Suitable solvents for the reaction include polar solvents, preferably isopropyl alcohol (isopropanol). The filler, silicone-based blocking agent, and the polar solvent are mixed at room temperature and allowed to dry sufficiently to evaporate the solvent. Once dried, the mixture is then heated in the range of about 200 to about 300 degrees C. for about one to about two hours. The resultant composition is of the general formula, $R_1$—O—$R_2$, where $R_1$ is the silicone-based blocking agent and $R_2$ is the filler. $R_1$ is the hydrophobic portion of the composition, thus producing a hydrophobic filler portion that, after compounding with a rubber polymer, produces a rubber compound that repels water and mud.

In an alternative embodiment, a hydrophobic rubber compound of the present invention is composed of a rubber polymer, which is then mixed with a hydrophobic group, comprising a hydrophobic, silicon based blocking agent, in a Banbury mixer with other necessary constituents, for example, fillers, anti-degradation agents, and curatives, depending upon the application. The hydrophobic group grafts to the polymer backbone during vulcanization. The hydrophobic rubber polymer produces a rubber compound that repels water and mud.

The rubber polymer of the present invention is compounded with a silicone-based blocking agent selected from the group consisting essentially of siloxanes, silanes, silanols, silazanes, silylenes, silyl groups, silyl radicals, cyclosilazanes, cyclosiloxanes, silicones, silsesquiazanes, silsesquioxanes, silsesquithianes, hydrocarbyl derivatives and combinations thereof.

The silicone-based blocking agent utilizes a mercapto, disulfide, or tetrasulfide functional group in the reaction with the unsaturated polymer backbone of the rubber. The preferred silicone-based blocking agent is mercaptopropyl siloxane, more preferably 3-mercaptopropyl polydimethylsiloxane.

The amount of the silicone-based blocking agent is proportional to the unsaturation in the backbone of the rubber polymer.

In the preferred embodiment, the mercapto functional group reacts with the hydrocarbon chain in the polymer backbone of the rubber, resulting in a mercaptopropyl siloxane grafting to the polymer backbone rubber during vulcanization of the rubber compound.

It is contemplated within the scope of the invention that any other needed additives may be additionally mixed in the Banbury mixer, resulting in a final hydrophobic compound. The resultant composition is of the general formula, $R_1$—$(CH_2)_x$—$S_y$—$R_2$, where $R_1$ is the silicone-based blocking agent, $S_y$ is a sulfur-based functional group, which may be a single sulfur atom or a chain, $R_2$ is the rubber polymer, and $x$ in $(CH_2)_x$ may be zero or greater. $R_1$ is the hydrophobic portion of the composition, thus producing a rubber polymer that repels water and mud.

The preferred embodiment of this invention utilizes both of the above embodiments to enhance the hydrophobicity of the resultant rubber compound. First, the filler is reacted with a silicone-based blocking agent with a hydroxy functional group as discussed herein above. Then, the rubber polymer is mixed in a Banbury mixer with a silicone-based blocking agent with a sulfur-based functional group as discussed herein above. Finally, both constituents, along with any other additives or fillers needed, are mixed in a Banbury mixer. The resultant rubber compound, which repels water and mud, has enhanced hydrophobicity over either constituent alone. The result is a highly effective water and mud repellant compound.

It is contemplated within the scope of the present invention that the above disclosed embodiments may be used alone or in conjunction, depending upon the application and the level of hydrophobicity desired.

EXAMPLE 1

A water and mud repellant composition of the present invention was prepared in a laboratory by mixing a silica filler, isopropyl alcohol, and a hydroxy functional polydimethylsiloxane.

The silica filler was added by weighing but the silica on an analytical balance. The silica used was Aerosil 200, which is manufactured by Degussa. The amount of Aerosil 200 added was 100 grams. The surface area of the Aerosil 200 was 200 m²/g.

Next the amount of polydimethylsiloxane, needed was estimated. The polydimethylsiloxane used was CRTV 944, which has hydroxy functional groups.

The Aerosil 200 was weighed out on an analytical balance to 100 grams. The CRTV 944 was then weighed out on an analytical balance to 25 grams.

The Aerosil 200 and CRTV 944 were then thoroughly mixed in a beaker with isopropyl alcohol (enough to make a slurry). The mixture was allowed to dry in hood or in a Friction Air oven overnight. When the mixture was completely dry, it was then heated for at least 1 hour at 260 C to react the Aerosil 200 and CRTV 944. The finished product was a hydrophobic silica powder. The powder was then molded onto the surface of a rubber component. This produced a coated rubber component that was hydrophobic. In testing the coated rubber component versus an uncoated rubber component, a 300% performance advantage in frictional force was realized using two pieces of the hydrophobic rubber submersed in mud as compared to non-hydrophobic rubber.

While the discussion and example presented herein refer to a rubber track belt or other tire rubber, it will be appreciated by those skilled in the art that the water and mud repellant compound of the present invention is also applicable to other rubber surfaces, for example in sealing applications, wherein it is desired to increase the water repellancy thereof.

Industrial Applicability

The present invention is particularly useful in making a water and mud repellant rubber composition by exploiting the hydrophobic chemistry of silicone-based blocking agents resulting in a rubber composition that repels water, soil, and mixtures of the two.

This invention is applicable in the manufacture of rubber components which are used for frictional engagement, in particular rubber track belts and vehicle tire treads. It also has application is various sealing systems.

Other aspects, features, and advantages of the present invention can be attained from a study of this disclosure together with the appended claims.

What is claimed is:

1. A composition, for use in a hydrophobic rubber, comprising:

a filler, and a compound having the formula:

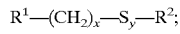

$$R^1\text{—}(CH_2)_x\text{—}S_y\text{—}R^2;$$

wherein $R^1$ is a hydrophobic, silicon-based blocking agent;

$S_y$ is a sulfur-based functional group;

$R^2$ is an unsaturated rubber polymer; and substantially no bonds are formed between the filler and the blocking agent.

2. A composition, as in claim 1, wherein said silicon-based blocking agent is selected from the group consisting essentially of siloxanes, silanes, silazanes, silylenes, cyclosilazanes, cyclosiloxanes, silicones, silsesquiazanes, silsesquioxanes, silsesquithianes, hydrocarbyl derivatives and combinations thereof.

3. A composition, as in claim 2, wherein said silicon-based blocking agent is a siloxane.

4. A composition, as in claim 3, wherein said silicon-based blocking agent is mercaptopropyl siloxane.

5. A composition, as in claim 1, wherein said sulfur-based functional group is selected from the group consisting essentially of mercapto, disulfide, tetrasulfide, and combinations thereof.

6. A composition, as in claim 1 further comprising another hydrophobic, silicon-based blocking agent coating said filler.

7. A composition, as in claim 6, wherein said another silicon-based blocking agent coating said filler is selected from the group consisting essentially of siloxanes, silanes, silanols, silazanes, silylenes, cyclosilazanes, cyclosiloxanes, silicones, silsesquiazanes, silsesquioxanes, silsesquithianes, hydrocarbyl derivatives and combinations thereof.

8. A composition, as in claim 7, wherein said another silicon-based blocking agent coating said filler is a siloxane.

9. A composition, as in claim 8, wherein said another silicon-based blocking agent coating said filler is a hydroxy siloxane.

10. A composition, as in claim 9, wherein said another silicon-based blocking agent coating said filler is hydroxy functional polydimethylsiloxane.

11. A composition, as in claim 6, wherein the filler and the another hydrophobic, silicon-based blocking agent are bonded together through an oxygen atom.

12. A composition, as in claim 1, wherein the filler is silica.

* * * * *